United States Patent [19]

Fukushima

[11] 4,072,773
[45] Feb. 7, 1978

[54] POROUS SHEET MATERIAL AND ITS PRODUCTION

[75] Inventor: Osamu Fukushima, Kurashiki, Japan

[73] Assignee: Kuraray Co., Ltd., Kurashiki, Japan

[21] Appl. No.: 660,098

[22] Filed: Feb. 23, 1976

Related U.S. Application Data

[62] Division of Ser. No. 392,137, Aug. 27, 1973.

[30] Foreign Application Priority Data

Aug. 30, 1972 Japan .................................. 47-86988

[51] Int. Cl.$^2$ ............................................... B05D 5/00
[52] U.S. Cl. ............................. 427/246; 260/2.5 AY; 264/45.5; 264/46.4; 427/340; 427/341; 428/212; 428/304; 428/904
[58] Field of Search ............... 428/304, 305, 212, 904; 260/2.5 AY; 427/246, 340, 341; 264/45.5, 46.4

[56] References Cited

U.S. PATENT DOCUMENTS

| | | | |
|---|---|---|---|
| 3,208,875 | 9/1965 | Holden | 427/246 |
| 3,284,274 | 11/1966 | Hulslander et al. | 428/904 |
| 3,483,015 | 12/1969 | Fukushima et al. | 428/904 |
| 3,515,573 | 6/1970 | Japs | 427/246 |
| 3,895,134 | 7/1975 | Kigane et al. | 427/246 |
| 3,929,949 | 12/1975 | Day et al. | 428/904 |
| 3,968,292 | 7/1976 | Pearman et al. | 428/305 |

*Primary Examiner*—William R. Dixon, Jr.
*Attorney, Agent, or Firm*—Barry Kramer

[57] ABSTRACT

A porous sheet material made of a polymeric material comprising mainly a polyurethane elastomer, which comprises a base layer of vertically penetrating vesicular structure and a surface layer of microporous structure integrally provided on at least one of the surfaces of the said base layer, which is suitable for the manufacture of a leather-like sheet product.

8 Claims, No Drawings

POROUS SHEET MATERIAL AND ITS PRODUCTION

This is a division, of application Ser. No. 392,137, filed Aug. 27, 1973.

The present invention relates to an improved porous sheet material made of a polymeric material comprising mainly a polyurethane elastomer and a method of making the same.

Hitherto, there have been known a number of porous sheet materials made of a polymeric material comprising mainly a polyurethane elastomer. In these conventional porous sheet materials, pores are formed in the whole of the polymeric material and the most part of the polymeric material has a partition wall like structure. That is, the cellular structures of the conventional porous sheet materials are independent spherical pores, continuous micropores, irregular long pores, irregular macrovesicles, inclined macropores, honeycomb-like cellular pores, etc. A leather-like sheet material made by applying such conventional porous sheet material as a surface material on a substrate is not satisfactory in visual and sensitive performances such as wrinkle of creases and feeling and not sufficient in physical and mechanical properties such as surface strength and bending resistance.

It has now been found that the use of a porous sheet material, comprising a base layer of vertically penetrating vesicular structure and a surface layer of microporous structure on one or both of the surfaces of the said base layer, as a surface material on a substrate can provide a leather-like sheet material much improved not only in visual and sensitive performances but also in physical and mechanical properties.

The porous sheet material of this invention comprises a base layer of vertically penetrating vesicular structure and a surface layer of microporous structure integrally provided on at least one of the surfaces of the base layer, the base layer and the surface layer being made of a polymeric material comprising mainly a polyurethane elastomer.

The polymeric material, of which the porous sheet material is made, comprises mainly a polyurethane elastomer.

The polyurethane elastomer may be an elastic polymer produced by polymerizing (a) at least one diol and (b) at least one organic diisocyanate with (c) a chain extender having at least two active hydrogen atoms.

Examples of the diol are polyester such as polyethylene adipate glycol, polyethylene propylene adipate glycol, polybutylene adipate glycol and polycaprolactone glycol, polyether diols such as polyethylene ether glycol, polypropylene ether glycol and polytetramethylene ether glycol, etc. Examples of the organic diisocyanate are as follows: 4,4'-diphenyl-methane diisocyanate, tolylene diisocyanate, xylylene diisocyanate, hexamethylene diisocyanate, etc. As the chain extender, there are exemplified ethylene glycol, propylene glycol, butylene glycol, hexamethylene glycol, hydrazine hydrate, ethylene diamine, butylene diamine, hexamethylene diamine, phenylene diamine, 4,4'-methylene bis(2-chloroaniline), etc.

In addition to the polyurethane elastomer, the polymeric material may contain any other polymer such as a linear condensation polymer having an ester bond, an amide bond and/or an urea bond, a vinyl polymer (e.g. polyvinyl chloride, polyacrylonitrile, polyacrylic ester) or an elastic polymer (e.g. acrylonitrile-butadiene copolymer, polyisoprene, polybutadiene). When these polymers are used, their amount should not exceed 50% by weight of the total weight of the polymeric material.

The porous sheet material of the invention may be produced by a variety of procedures. When the porous sheet material is composed of a base layer of vertically penetrating vesicular structure and a surface layer of microporous structure integrally provided on one of the surfaces of the base layer, it may be produced, for instance, by applying a polymer composition in solution on a support material and treating the resulting sheet material in a first stage coagulation bath at 35° to 65° C to coagulate the surface of the said sheet material and then in a second stage coagulation bath at a temperature not less than 5° C lower than the temperature of the said first stage coagulation bath to complete the coagulation.

When the porous sheet material is composed of a base layer of vertically penetrating vesicular structure and a surface layer of microporous structure integrally provided on each of the surfaces of the base layer, it may be produced, for instance, by applying a polymer composition in solution onto a support material previously provided with a solid or solution film of a polymeric material soluble in the said polymer composition in solution and treating the resulting sheet material in a first stage coagulation bath at 35° to 65° C to coagulate the surface of the said sheet material and then in a second stage coagulation bath at a temperature not less than 5° C lower than the temperature of the said first stage coagulation bath to complete the coagulation.

The polymer composition in solution used in the procedures as above may be a solution of the said polymeric material and a cellular structure regulating agent in a solvent such as dimethylformamide, diethylformamide, dimethylacetamide or dimethylsulfoxide. The concentration of the polymeric material in the composition is usually from 7 to 35% by weight, preferably from 10 to 25% by weight.

As the cellular structure regulating agent, there may be used a material which is crystallized out in the form of plates, leaflets, or needles under the conditions for coagulation, preferably not crystallized out in the first stage coagulation bath but crystallized out in the second stage coagulation bath. Specific examples of the cellular structure regulating agent are octadecyl alcohol, dihydroxynaphthalene, α-hydroxyisovaleric acid, isovanillic acid, etc. Other higher alcohols and higher carboxylic acids may be also used. The amount of the cellular structure regulating agent may be usually used from 3 to 25% by weight on the weight of the said polymeric material.

In addition to the said essential components, the polymer composition may contain any coagulation regulating agent such as water, lower alcohols, glycerols, lower carboxylic acids, aromatic hydrocarbons (e.g. benzene, toluene), glycerol aliphatic carboxylates and sorbitan aliphatic carboxylates. These coagulation regulating agents can serve to control the coagulation rate, the formation state of pores, the action of the cellular structure regulating agent and the like. The amount of the coagulation regulating agent may be from 0.5% to 20% by weight based on the total weight of the polymer composition.

Moreover, the polymer composition may contain any other additive such as a pigment, when desired.

The polymeric material which may be used for the formation of a solid or solution film on the support material is required to be soluble in the said polymer composition. Specific examples of such polymeric material are a polyurethane elastomer, a cellulose derivative, an acrylic resin, natural rubber, synthetic rubber, a halogen-containing resin, an urea resin, a modified polyamide, an ester resin, a pyridine resin, etc. When applied on the support material, these polymeric materials are used in the form of a solution in a solvent such as dimethyl formamide, dimethyl acetamide, dioxane, acetone, cyclohexane, cyclohexanone, tetrahydrofuran or ethylacetate. Their concentration in such solution may be from 3 to 50% by weight, preferably from 5 to 40% by weight.

In the coagulation baths for the first stage coagulation and the second stage coagulation, there are charged any solvent into which the polymeric material mainly comprising a polyurethane elastomer is insoluble. Specific examples of such solvent are water, lower alcohols, lower carboxylic acids, glycerols, etc. When desired, these solvents may be used in combination with any solvent into which the polymeric material is soluble such as dimethylformamide, dimethylsulfoxide or dimethylacetamide, provided that the amount of the latter does not prevent the coagulation of the polymeric material.

One of the important characteristic features of the invention is present in the relationship between the temperatures of the first stage coagulation bath and of the second stage coagulation bath. The temperature of the first stage coagulation bath is required to be from 35° to 65° C. In case of the temperature being lower than 35° C, the pores in the surface layer becomes irregular and giant. In case of the temperature being higher than 65° C, the pores as formed are too minute. The temperature of the second stage coagulation bath is required to be not less than 5° C lower than the temperature of the first stage coagulation bath. When the difference is less than 5° C, it is difficult to form a vertically penetrating vesicular structure. Usually, the temperature of the second stage coagulation bath may be not more than 50° C.

The porous sheet material after coagulation may be washed with water to eliminate the solvent from the polymeric material and then with any solvent which does not dissolve the polymeric material to eliminate the cellular structure regulating agent, the coagulation regulating agent and so on, followed by drying. In alternative, the elimination of the solvent, the cellular structure regulating agent, the coagulation regulating agent and so on may be accomplished by heating.

The thus produced porous sheet material is composed of a base layer of vertically penetrating vesicular structure and a surface layer of microporous structure integrally provided on one or both of the surfaces of the base layer. The size of the pores in the surface layer is smaller than that in the base layer in average and favored to be so minute as can not be observed macroscopically or by a microscope of a low magnification. (The term "size" herein used for the pores indicates the capacity or volume of each pore.) On the other hand, the size of the pores in the base layer may be so large as can be observed by a microscope of not more than 50 magnification. The detailed observation of the vesicular structure in the base layer reveals the presence of numerous vertically split pores and the penetration of an unlimited number of pores through the base layer. When the surface layer is present only on one of the surfaces of the base layer, the opposite surface can be observed to have the openings of the penetrating pores by the aid of a microscope of not more than 50 magnification. The vertically penetrating vesicles in the base layer include not only those independent from each other but also those continuous to each other.

In general, the porous sheet material composed of the base layer and the surface layer of the invention has an apparent density of 0.18 to 0.65 g/cm$^3$, preferably of 0.2 to 0.50 g/cm$^3$. In case of the density being below 0.18 g/cm$^3$, the strength and various other properties of the porous sheet material as a surface material in a leather-like sheet product are made inferior. In case of the density being above 0.65 g/cm$^3$, the repelence is increased and the air permeability and the moisture permeability are decreased. Preferably, the air permeability measured after scraping off the surface layer in an amount of 2 to 10 g/m$^2$ according to the method as described in JIS (Japan Industrial Standard) P 8111 is to be not more than 3 minutes, because a leather-like sheet product obtained by bonding the porous sheet material on a substrate does not produce any "uncomfortable moisture retention" in shoes manufactured therewith.

As understood from the above description, the porous sheet material of the invention can be bonded on the surface of a substrate made of a fibrous material such as a woven cloth, a knitted cloth, a paper or a non-woven fabric cloth, which may contain a polyurethane elastomer or any other elastic polymer to make a leather-like sheet product. For the bonding, there may be employed any conventional procedure. For instance, a solvent which can dissolve at least one of the porous sheet material and the substrate or a solution of a polymeric material in such solvent is applied on the surface(s) of the porous sheet material and/or the substrate, and their surfaces are brought into close contact. On the application of the solvent or the polymeric material solution, the adoption of a procedure using a gravure roll is favored, because the air permeability and the moisture permeability of the resulting leather-like sheet product is kept in an excellent state.

Practical and presently preferred embodiments of the invention are illustratively shown in the following Examples wherein % is by weight.

EXAMPLE 1

Polycaprolactone type polyurethane elastomer is dissolved in dimethylformamide (hereinafter referred to as DMF) to make a concentration of 13%, and octadecyl alcohol purified in plates and served as a cellular structure regulating agent is added thereto in an amount of 8% based on the weight of the polyurethane elastomer. Further, water and toluene served as coagulation regulating agents are added to the solution respectively in amounts of 4% and of 1% based on the weight of the solution to prepare a polymer composition.

The above mentioned polymer composition maintained at 50° C is coated on a polyethylene sheet maintained at a temperature of 50° C in an amount of 100 g (as polyurethane)/m$^2$ according to the casing method, after which the resultant material is kept in a first stage coagulation bath containing 30% aqueous DMF solution at a temperature of 50° C for 10 seconds and then in a second stage coagulating bath containing 30% aqueous DMF solution at a temperature of 27° C until the coagulation is completed.

The resulting porous sheet material is washed in 75° C running water to remove the solvent and then in a methanol bath to remove the additives, after which it is set to a fixed width and dried at 70° C.

The porous sheet material thus obtained comprises a surface layer of microporous structure in approximately 1/5 of the whole thickness (on the surface side at the coagulation) and a base layer of vertically penetrating vesicular structure under the said surface layer showing the reverse as if planted with piles. When observed microscopically (40 folds), there are seen the openings of pores on the reverse. The porous sheet material is about 0.37 mm in thickness and about 0.27 g/cm$^3$ in density. The air permeability of the porous sheet material after scraping off the surface layer in an amount of 2 g/m$^2$ is 90 seconds.

EXAMPLE 2

As in Example 1 but using a polymer composition wherein only water is employed as a coagulation regulating agent in an amount of 4%, there is prepared a porous sheet material. The porous sheet material thus obtained comprises a surface layer and a base layer as in Example 1 but the base layer has larger vesicles and is softer. It is about 0.45 mm in thickness and about 0.22 g/cm$^3$ in density.

EXAMPLE 3

A 7% solution of polycaprolactone type polyurethane elastomer (hard polyurethane elastomer containing a larger amount of hard segments than the one used in Example 1) in DMF is applied on the surface of a polyethylene sheet in an amount of 6.5 g/m$^2$ (as polyurethane) according to a procedure utilizing the surface tension of the solution, following by drying to form a film. On the film, a polymer composition as in Example 1 maintained at 50° C is applied in an amount of 100 g/m$^2$ (as polyurethane) according to the casting method. After allowing to stand for about 20 seconds, the resultant sheet is treated as in Example 1 to complete the coagulation.

The porous sheet material thus obtained comprises a surface layer of microporous structure in approximately one-fifth of the whole thickness (on the surface side at the coagulation), a reverse layer of minute porous structure in about 4 μ (on the side contacting with the polyethylene sheet as a support material at the coagulation) and a base layer of vertically penetrating vesicular structure as an intermediary layer between them.

On one of the surfaces of a substrate composed of a fibrous mat made of microfibril bundles of special fiber and a polyester type polyurethane sponge, the said porous sheet material is bonded in such a manner that the surface layer is contacted with the said surface of the substrate. The surface of the bonded material (i.e. the reverse layer of the said porous sheet material) is subjected to finishing treatment such as coloring and embossing to make a leather-like sheet product having micropores on the surface and provided various advantageous properties such as high surface strength, small repellency, superior softness, excellent processability and high moisture permeability as well as calf-like wrinkle of creases. Thus, the leather-like sheet product is highly suitable for the manufacture of shoes.

EXAMPLE 4

Polyethylene adipatediol-polytetramethylene ether glycol (weight ratio, 4 : 6) type polyurethane elastomer is dissolved in DMF to make a concentration of 12%, and isovanillic acid served as a cellular structure regulating agent is added thereto in an amount of 10% based on the weight of the polyurethane elastomer. Further, water and glycerol served as coagulation regulating agents are added to the solution respectively in amounts of 3% and of 3% based on the weight of the solution to prepare a polymer composition.

A 25% solution of polycaprolactone type polyurethane elastomer in DMF is incorporated with cellulose octadecyl urethane served as a cellular structure regulating agent in an amount of 5% based on the weight of the polyurethane elastomer, and the resulting solution is applied on the surface of a polyethylene sheet as a support material in an amount of 8 g/m$^2$ (as polyurethane) by the aid of a knife coater. The resulting sheet is kept at 55° C, and the above mentioned polymer composition is applied thereon in an amount of 110 g/m$^2$ according to the casting method, after which the resultant material is kept in a first stage coagulation bath containing 35% aqueous DMF solution at a temperature of 55° C for 8 seconds and then in a second stage coagulation bath containing 30% aqueous DMF solution at a temperature of 30° C until the coagulation is completed.

The resulting porous sheet material is washed in 10° C running water to remove the solvent and then in a methanol bath to remove the additives, after which it is passed through a methanol bath containing a dyestuff. Then, the porous sheet material is placed over a heated mirror surface stainless belt in contact therewith for drying and, after cooling, detached and taken up.

The porous sheet material thus obtained comprises a surface layer of microporous structure in approximately 1/5 of the whole thickness (on the surface side at the coagulation), a reverse layer of minute porous structure in about 4 μ thick (on the side contacting with the polyethylene sheet at the coagulation) and a base layer of vertically penetrating vesicular structure as an intermediary layer between them.

The porous sheet material is about 0.34 mm in thickness and about 0.347 g/cm$^2$ in density. The air permeability of the porous sheet material after scraping off the surface layer in an amount of 5 g/m$^2$ is 190 seconds.

A leather-like sheet product obtained by bonding the porous sheet material on a substrate composed of fibrous bundles and a spongly polyurethane is quite suitable for the manufacture of shoes.

EXAMPLE 5

A blend of polytetramethylene type polyurethane elastomer (75 parts) and polyvinyl chloride (25 parts) is dissolved in DMF to make a concentration of 15%, and octadecyl alcohol and dihydroxynaphthalene served as cellular structure regulating agents are added thereto respectively in amounts of 3% and of 5% based on the weight of the blend. Further, water and cyclohexanone are added to the solution respectively in amounts of 2.5% and of 2% based on the weight of the solution to prepare a polymer composition.

The above mentioned polymer composition maintained at 60° C is applied on a chrome-plated stainless belt maintained at a temperature of 55° C in an amount of 95 g/m$^2$ (as the polymer) according to the casting method, after which the resultant material is kept in a first stage coagulation bath containing 35% aqueous DMF solution at a temperature of 40° C for 10 seconds and then in a second stage coagulation bath containing 25% aqueous DMF solution at a temperature of 30° C until the coagulation is completed.

The resulting porous sheet material is washed in running water to remove the solvent and then in a methanol bath to remove the additives, after which it is dried.

The porous sheet material thus obtained is 0.31 mm in thickness and 0.306 g/cm³ in density.

What is claimed is:

1. A process for producing a porous sheet material made of a polymeric material consisting essentially of a polyurethane elastomer, which comprises applying a polymer composition in solution consisting essentially of a polyurethane elastomer and a cellular structure regulating agent, in an amount of from 3 to 25% by weight based on the weight of the polymer composition, on a support material and treating the resulting sheet material in a first stage coagulation bath at 35° to 65° C to coagulate the surface of said sheet material and then in a second stage coagulation bath at a temperature not less than 5° C lower than the temperature of the said first stage coagulation bath to complete the coagulation to obtain the porous sheet material comprising a base layer of vertically penetrating vesicular structure and a surface layer of microporous structure integrally provided on one of the surfaces of the said base layer.

2. The process according to claim 1, wherein the cellular structure regulating agent is a material crystallized in plates, leaflets or needles under the conditions of the second stage coagulation.

3. The process according to claim 1, wherein the polymer composition in solution further contains at least one coagulation regulating agent in an amount of 0.5 to 20% by weight base on the weight of the polymer composition in solution.

4. The process according to claim 3, wherein the coagulation regulating agent is a member selected from the group consisting of water, lower alcohols, glycerols, lower carboxylic acids, aromatic hydrocarbons, glycerol aliphatic carboxylates and sorbitan aliphatic carboxylates.

5. A process for producing a porous sheet material made of a polymeric material consisting essentially of a polyurethane elastomer, which comprises applying a polymer composition in solution consisting essentially of a polyurethane elastomer and a cellular structure regulating agent, in an amount of from 3 to 25% by weight based on the weight of the polymer composition, on a support material on which is previously provided a solid or solution film of a polymeric material soluble in the said polymer composition in solution and treating the resulting sheet material in a first stage coagulation bath at 35° to 65° C to coagulate the surface of the said sheet material and then in a second stage coagulation bath at a temperature not less than 5° C lower than the temperature of the said first stage coagulation bath to complete the coagulation to obtain the porous sheet material comprising a base layer of vertically penetrating vesicular structure and a surface layer of microporous structure integrally provided on each of the surfaces of the said base layer.

6. The process according to claim 5, wherein the cellular structure regulating agent is a material crystallized in plates, leaflets or needles under the conditions of the second stage coagulation.

7. The process according to claim 5, wherein the polymer composition in solution further contains at least one coagulation regulating agent in an amount of 0.5 to 20% by weight based on the weight of the polymer composition in solution.

8. The process according to claim 7, wherein the coagulation regulating agent is a member selected from the group consisting of water, lower alcohols, glycerols, lower carboxylic acids, aromatic hydrocarbons, glycerol aliphatic carboxylates and sorbitan aliphatic carboxylates.

* * * * *